United States Patent
Lovette

(10) Patent No.: US 8,885,235 B2
(45) Date of Patent: Nov. 11, 2014

(54) SCANNER CALIBRATION CORRECTING FOR FOREIGN MATTER DEBRIS

(71) Applicant: Xerox Corporation, Norwalk, CT (US)

(72) Inventor: Whynn V. Lovette, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 89 days.

(21) Appl. No.: 13/689,835

(22) Filed: Nov. 30, 2012

(65) Prior Publication Data

US 2014/0153058 A1 Jun. 5, 2014

(51) Int. Cl.
| | |
|---|---|
| *H04N 1/46* | (2006.01) |
| *H04N 1/60* | (2006.01) |
| *H04N 1/00* | (2006.01) |
| *H04N 1/12* | (2006.01) |
| *H04N 1/193* | (2006.01) |

(52) U.S. Cl.
CPC ....... *H04N 1/00013* (2013.01); *H04N 1/00031* (2013.01); *H04N 1/00045* (2013.01); *H04N 1/00063* (2013.01); *H04N 1/00087* (2013.01); *H04N 1/1215* (2013.01); *H04N 1/1235* (2013.01); *H04N 1/125* (2013.01); *H04N 1/193* (2013.01); *H04N 2201/0081* (2013.01); *H04N 2201/044* (2013.01)
USPC .............................. 358/504; 358/1.9; 358/406

(58) Field of Classification Search
None
See application file for complete search history.

(56) References Cited

U.S. PATENT DOCUMENTS

| | | | |
|---|---|---|---|
| 5,285,293 A | 2/1994 | Webb et al. | |
| 5,736,735 A | 4/1998 | Hagiwara | |
| 6,125,213 A | 9/2000 | Morimoto | |
| 6,452,631 B1 * | 9/2002 | Hsu et al. | 348/254 |
| 6,792,161 B1 | 9/2004 | Imaizumi et al. | |
| 7,113,619 B1 | 9/2006 | Matama | |
| 7,183,532 B2 | 2/2007 | Gann | |
| 7,773,270 B2 | 8/2010 | Haas et al. | |
| 7,804,622 B2 * | 9/2010 | Hiromatsu et al. | 358/1.9 |
| 7,817,317 B2 * | 10/2010 | Ito | 358/516 |
| 7,848,688 B2 | 12/2010 | Murayama | |
| 7,889,251 B1 * | 2/2011 | Ng et al. | 348/257 |
| 8,164,805 B2 * | 4/2012 | Shibahara | 358/475 |
| 8,179,576 B2 * | 5/2012 | Hayashi | 358/520 |
| 8,649,073 B2 * | 2/2014 | Natalaray et al. | 358/498 |
| 8,693,060 B2 * | 4/2014 | Ito | 358/3.26 |
| 2002/0149799 A1 * | 10/2002 | Hayashi | 358/406 |
| 2003/0067612 A1 * | 4/2003 | Ivarsson | 356/600 |
| 2010/0134688 A1 * | 6/2010 | Moriwake | 348/586 |
| 2010/0290093 A1 * | 11/2010 | Ito | 358/461 |
| 2011/0096378 A1 * | 4/2011 | Wang et al. | 358/498 |
| 2011/0205389 A1 * | 8/2011 | Zhang | 348/223.1 |
| 2011/0228349 A1 * | 9/2011 | Iwayama et al. | 358/474 |
| 2012/0314266 A1 * | 12/2012 | Natalaray et al. | 358/498 |
| 2013/0010338 A1 * | 1/2013 | Tanaka et al. | 358/475 |
| 2013/0135484 A1 * | 5/2013 | Satoh et al. | 348/207.2 |
| 2013/0162998 A1 * | 6/2013 | Furuta | 356/402 |
| 2013/0329266 A1 * | 12/2013 | Tu et al. | 358/497 |

* cited by examiner

*Primary Examiner* — Madelein A Nguyen
(74) *Attorney, Agent, or Firm* — Gibb & Riley, LLC

(57) ABSTRACT

Devices and methods calibrate an optical scanner by having the scanner scan a calibration surface. The scanner includes a lens causing a distortion of items scanned. During the calibration process, such devices and methods perform a compensation process to remove the distortion from signals output by the scanner when performing the scanning to identify at least one surface irregularity on the calibration surface. After performing the compensation process, the devices and methods adjust the calibration process (using the processor) to apply correction for pixels affected by the surface irregularity. Then, after adjusting the calibration settings, such devices and methods finalize the calibration process and store the scanner settings, again using the processor.

24 Claims, 5 Drawing Sheets

SCANNER CALIBRATION CORRECTING FOR FOREIGN MATTER DEBRIS

BACKGROUND

Embodiments herein generally relate to the calibration of optical sensors and more particularly to correcting for foreign matter debris that may be located on the calibration surface.

Often optical sensors are used in environments that suffer from constant debris sources. For example, optical sensors used within media paths can be constantly exposed to media-type debris. Many times optical sensors are calibrated by scanning a calibration surface of a known uniform color. This calibration surface is usually a uniform white surface and, therefore, the calibration surface is sometimes referred to as a "white reference."

When the white reference calibration surface is contaminated with foreign matter debris, this can undesirably alter the calibration of the portions (pixels) of the sensor that observed for the debris instead of serving the calibration surface. More specifically, the affected pixels will be calibrated as though the color white is the color of the debris and this will affect all future items scanned by the affected pixels until the calibration surface is cleaned and the scanner is recalibrated.

For example, FIG. 1 illustrates an undesirable line 102 within a scanned image 100. This undesirable line 102 is caused by one or more pixels that were improperly calibrated because foreign matter debris was present on the calibration surface during calibration. The items scanned will pass between the scanner and the calibration surface, causing the improperly calibrated pixels to create the undesirable line 102. With conventional systems, the undesirable line 102 will occur in all scanned images until the calibration surface is cleaned and the scanner is recalibrated.

SUMMARY

An exemplary method herein performs a calibration process of an optical scanner positioned on a first side of a media path by having the scanner scan a calibration surface position on a second side of the media path across from the scanner. The scanner includes a lens that can cause distortion of items scanned.

During the calibration process, this exemplary method performs a compensation process (by hardware or by using a processor operatively connected to the scanner) to remove the distortion from signals output by the scanner when performing the scanning and to identify at least one surface irregularity on the calibration surface. The compensation process increases the prominence of the signals that identify the surface irregularity by removing the distortion from the signals output by the scanner. Further, this process can identify the surface irregularity by matching the signals output by the scanner to known signals caused by surface debris.

In one specific example, the compensation process can calculate a ratio of a white reference profile to a delayed reference profile to produce a unity profile. The white reference profile is an undistorted profile of the calibration surface, and the delay reference profile comprises the signals output by the scanner, delayed by a delay period. The delay period is the light delay time caused by the shape of the lens. The unity profile reveals pixel-to-pixel differences up to the size of the delay period (to identify the surface irregularity). As would be understood by those ordinarily skilled in the art, other processes could be used to remove the distortion from signals output by the scanner. After performing the compensation process, this method adjusts the calibration process (using the processor or hardware) to apply correction for pixels affected by the surface irregularity.

Then, after adjusting the calibration settings, this exemplary method finalizes the calibration process and stores the scanner settings, again using the processor or hardware. After storing the scanner settings, during regular (non-calibration) operations, such a method will scan sheets of media moving along the media path (using the scanner settings) as the sheets of media pass by the scanner. The correction is only applied during the calibration process and the correction not is applied during the scanning of the sheets of media.

An apparatus embodiment herein can comprise any device that uses a fixed scanner in an area that will suffer potential contamination by foreign matter debris, such as a multi-function printing device. Such a device will include a media path which can be, for example in a document handler or internal to the device. A first scanner is positioned at a first location of the media path, and a first calibration surface is positioned at the first location of the media path across from the scanner. The first scanner and the first calibration surface are in fixed, non-movable locations with respect to each other and with respect to the media path.

Also, a second movable scanner can be positioned at a second location of the media path different than the first location, and a second calibration surface can be positioned at the second location of the media path. The second scanner can be movable over the second calibration surface, and the second calibration surface may be protected from debris.

Also, a processor can be operatively (meaning directly or indirectly) connected to the first scanner and the second scanner. The first scanner can include a lens that causes a distortion of items scanned. The processor or hardware performs a calibration process of the first scanner by scanning the first calibration surface using the first scanner. During the calibration process, the processor or hardware performs a compensation process to remove the distortion from signals output by the first scanner when performing the scanning to identify at least one surface irregularity on the first calibration surface. After performing the compensation process, the processor or hardware adjusts the calibration process to apply correction for pixels affected by the surface irregularity. After adjusting the calibration settings, the processor finalizes the calibration process and stores the first scanner settings.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, when the white reference calibration surface is contaminated with foreign matter debris, this can undesirably alter the calibration of the portions of the sensor (e.g., pixels) that observed the debris instead of observing the calibration surface. This issue is even more pronounced for scanners that are fixed in position relative to the calibration surface because with fixed position sensors, each pixel of the scanner can only observe one area of the calibration surface, and if that area is contaminated with debris, the affected pixels will only observe the debris. To the contrary, scanners that move across a calibration surface can more easily identify debris particles and avoid using data that was obtained when the scanner was positioned over the debris locations. However, many times because of space or cost constraints, it is desirable to use fixed position sensors.

Figure 1:
FIG. 1 is a schematic diagram of scanned image.
Figure 2:
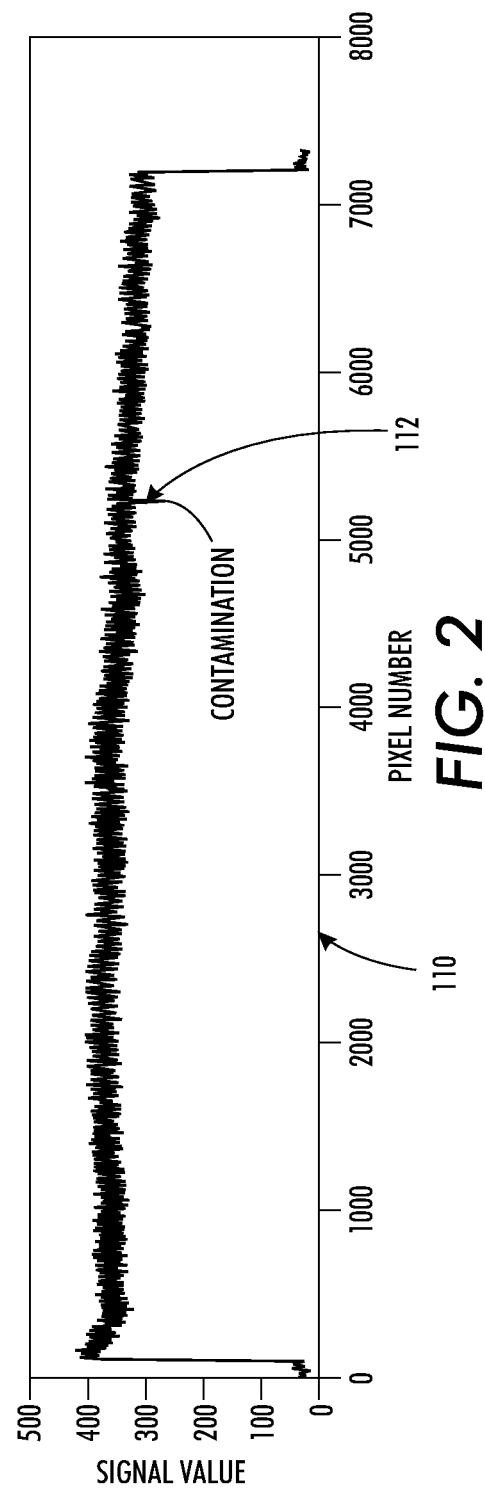
FIG. 2 is a side-view schematic diagram of a device according to embodiments herein.

FIG. 2 is a graph 110 that illustrates the raw signals output by a fixed position scanner scanning a fixed position calibration surface having debris contamination 112. However, the shape of the lens of the scanner produces distortion that can make the debris contamination difficult to identify. This distortion that is caused by the shape of the scanner lens is sometimes referred to as "lens ripple" and the lens ripple can obscure the debris contamination 112.

Figure 3:
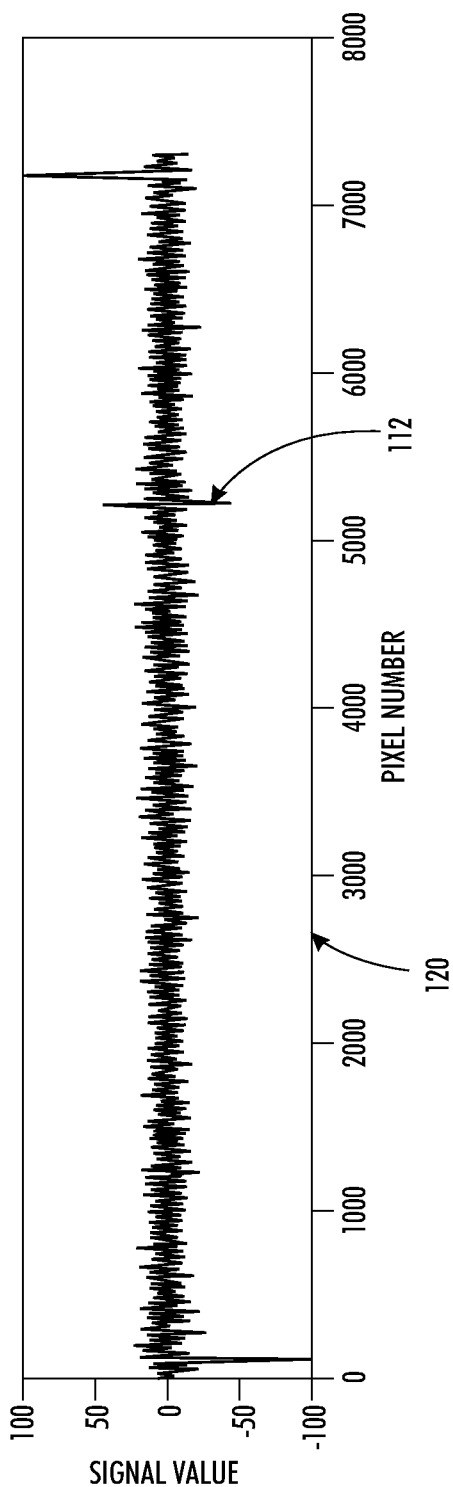
FIG. 3 is a graph illustrating signals produced by an optical scanner.

Therefore, the devices and methods herein remove the distortion as shown in the graph 120 in FIG. 3 to allow the debris contamination 112 to be more easily identified. By reducing the distortion from the data in FIG. 2, lens ripple has been significantly reduced and the contamination 112 is now prominent in FIG. 3.

Many methods can be used to filter the distortion to allow the debris contamination to be more easily identified. In one example, the devices and methods herein generate a contamination profile by taking the ratio of the white reference profile and a delayed reference profile. The delay of the delayed reference profile is based on the period of the scanner lens typically used in contact image sensors. The result is a unity profile that reveals pixel-to-pixel differences up to the size of the delay. The magnitude and location of the contamination revealed in the profile is used to count affected pixels for maintenance and also is applied as correction to the video during calibration.

This captured result in FIG. 3 is used to detect contamination and apply correction to the calibration video using a threshold to change the improperly calibrated pixels to match pixels that did not suffer from the debris. The devices and methods herein provide a solution that only affects the calibration process to ensure that the calibration of scanners ignores the affects of debris on the white reference surface. Since the effect of the contamination passes to the image only via the calibration process, correction is only applied to the video used for calibration and no additional correction factors or methods need be applied to scanned images.

Figure 4:
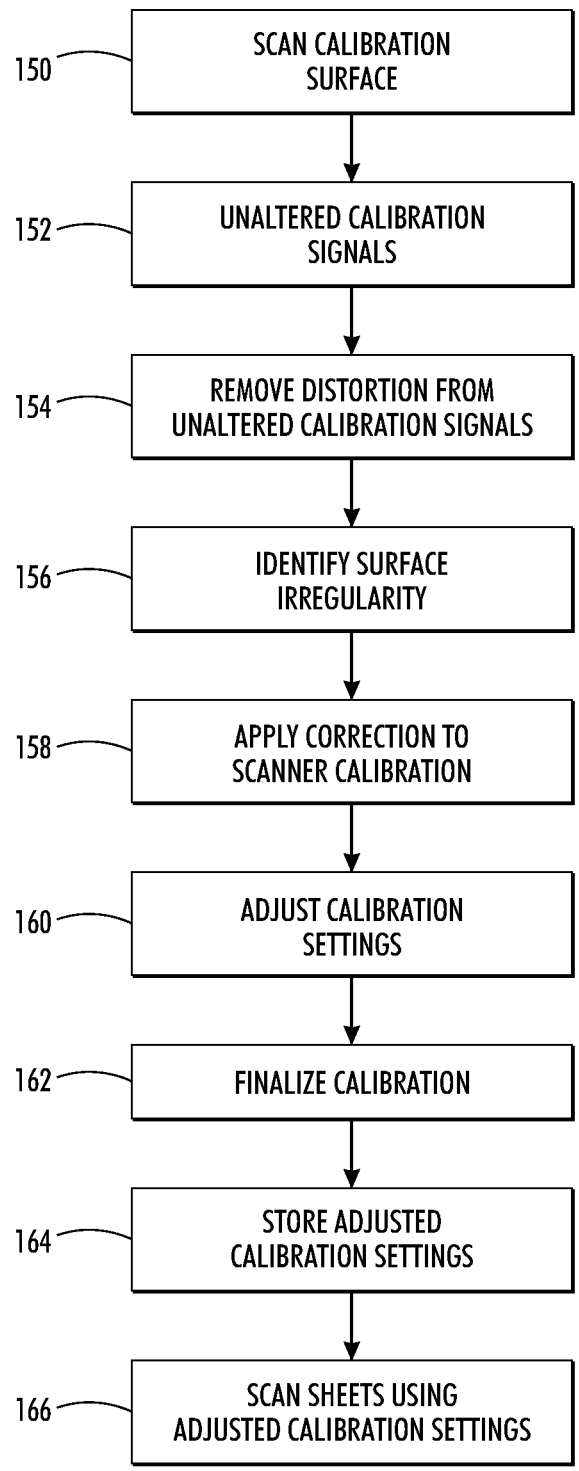
FIG. 4 is a graph illustrating corrected signals produced by an optical scanner according to embodiments herein.

FIG. 4 is flowchart illustrating an exemplary method herein that performs a calibration process of a fixed-position optical scanner. In one embodiment, the optical scanner is positioned on a first side of a media path. In item 150, the scanner scans the calibration surface that is positioned on a second side of the media path across from the scanner to produce unaltered calibration signals. Scanning herein means light sensors (such charge-coupled devices (CCDs), transistors, diodes, photodiodes, etc.) detecting the presence of, strength of, wavelength of, etc., light waves, reflected light, electromagnetic radiation of an observable wavelength, etc., from a specific area of an item (such as a location of a calibration surface or a sheet of media being scanned). As mentioned above, the scanner includes a lens that can cause distortion of items scanned.

During the calibration process, in item 154 this exemplary method performs a compensation process (using hardware or a processor operatively connected to the scanner) to remove the distortion from the signals output by the scanner when performing the scanning (150).

In one specific example, the compensation process that removes the distortion in item 154 can calculate a ratio of a white reference profile to a delayed reference profile to produce a unity profile. The white reference profile is an undistorted profile of the calibration surface (what is theoretically expected to be detected from a perfectly clean and uniformly white surface of a specific wavelength). The delay reference profile comprises the signals output by the scanner delayed by a delay period. The delay period is the light delay time caused by the shape of the lens and varies from lens shape to lens shape. The unity profile reveals pixel-to-pixel differences up to the size of the delay period (to identify the surface irregularity). As would be understood by those ordinarily skilled in the art, other processes could be used to remove the distortion from the unaltered signals output by the scanner in item 152, such as filters, etc.

This allows the compensation process to identify at least one surface irregularity on the calibration surface in item 156. The compensation process increases the prominence of the signals that identify the surface irregularity by removing the distortion from the signals output by the scanner (154).

Further, this process can optionally identify the surface irregularity in item 156 using many different processes, such as by matching the signals output by the scanner to known signals caused by surface debris. Therefore, debris may produce a limited number of common signatures (within a specific color range, within a specific size, etc.) and when these signatures are present, the irregularity can be identified as debris. Further, the location of the debris can be determined according to the location of the pixel that detected the debris so that the user can be notified of the location of the debris on the calibration surface.

After identifying the surface irregularity, this method adjusts the calibration process (using the processor or hardware) to apply correction for pixels affected by the surface irregularity in item 158 to produce adjusted calibration settings 160. Thus, in item 158, this method can ignore the data from the pixel(s) that detected light from debris areas of the calibration surface and substitute other calibration data in place of such signals. In one example, the correction can use settings of adjacent pixels in place of the settings for the pixels affected by the surface irregularity. Such "adjacent" pixels are pixels that are directly next to the pixels affected by the surface irregularity, but such adjacent pixels and are not affected by the surface irregularity themselves. Alternatively, factory calibration (or other historical calibration settings) can be used in place of the settings for the pixels affected by the surface irregularity.

Then, after adjusting the calibration settings, this exemplary method finalizes the calibration process in item 162 and stores the adjusted scanner settings in item 164, again using the processor or hardware. The adjusted scanner calibration settings in item 164 are debris-free scanner calibrations settings that are consistent with a calibration surface that has no debris or other foreign matter.

After storing the scanner settings in item 164, during regular (non-calibration) operations, such a method scans sheets of media moving along the media path (using the adjusted scanner settings) as the sheets of media pass by the scanner in item 166. Thus, with devices and methods herein, correction is only applied during the calibration process and the correction not is applied during the scanning of the sheets of media because the scanner is calibrated as though the calibration surface was free of debris.

Figure 5:
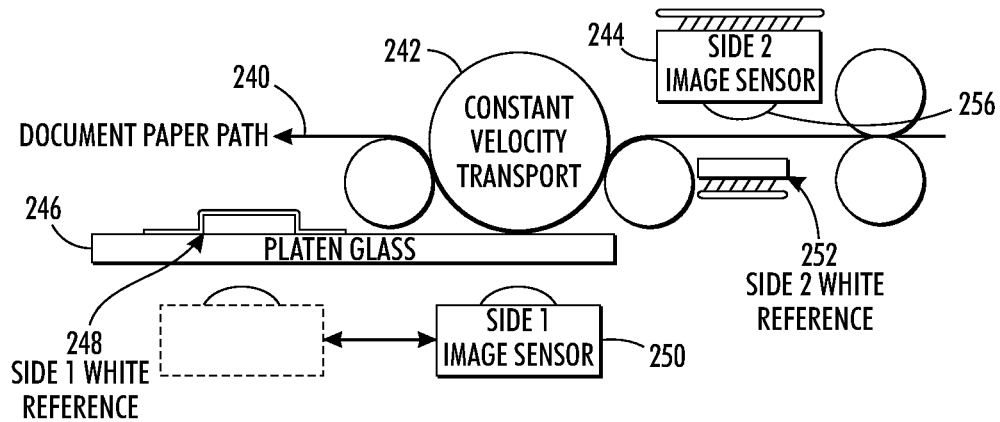
FIG. 5 is a flow diagram illustrating aspects of the embodiments herein.

FIG. 5 illustrates an exemplary structure that may be included in the document handler 212 or the printing device housing 204 of the device illustrated in FIG. 6, discussed below. More specifically, FIG. 5 illustrates a document paper path 240 that uses various transport rollers 242 to move sheets of media through the device. A side2 image sensor 244 is a fixed position scanner that is positioned at a first location of the media path, and a first calibration surface (side2 white reference 252) is positioned at the first location of the media path across from the first scanner 244. The first scanner 244 and the first calibration surface 252 are in fixed, non-movable locations with respect to each other and with respect to the media path 240.

Also, a second movable scanner (side1 image sensor 250) can be positioned at a second location of the media path 240 different than the first location, and a second calibration surface (side1 white reference 248) can be positioned at the second location of the media path. In this example, the second calibration surface 248 is connected to the platen glass 246, and is therefore protected from debris by the platen glass 246. As shown in FIG. 5, the second scanner 250 can be moved over the second calibration surface 248, during calibration.

Because the first calibration surface 252 is exposed to the media path 240, it is more likely to become contaminated with debris, when compared to the second calibration surface 248 that is protected by the platen 246 from debris. Therefore, the devices and methods herein provide a solution to proper calibration even in the presence of debris on the first calibration surface 252.

Figure 6:
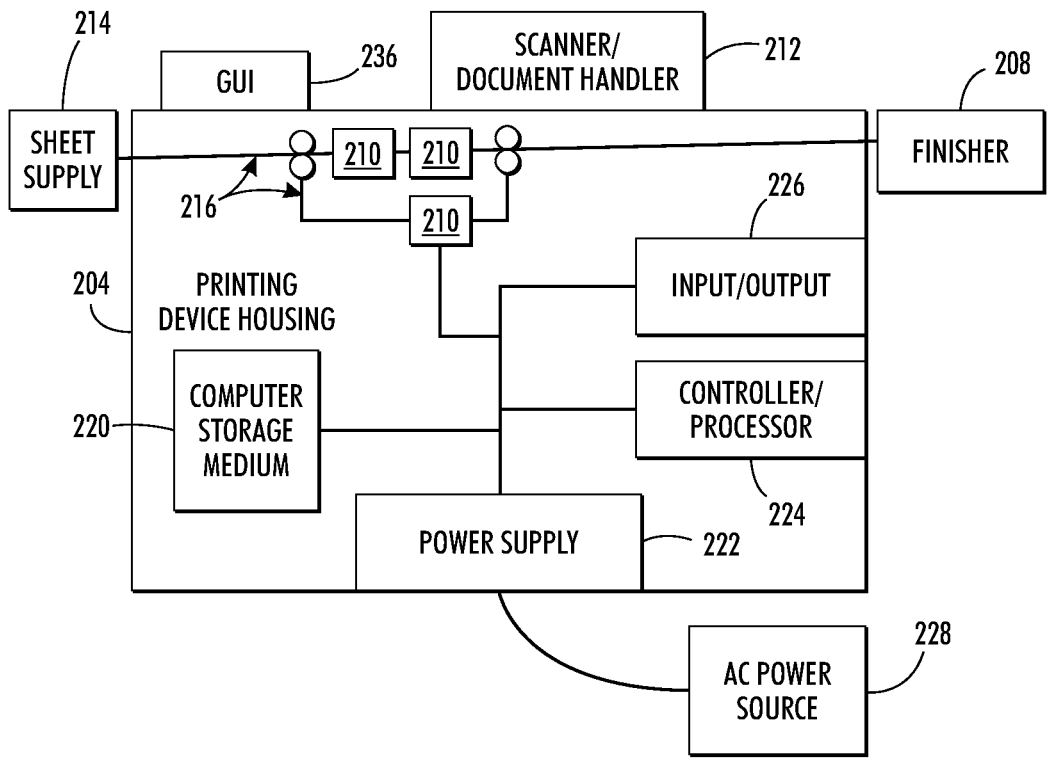
FIG. 6 is a side-view schematic diagram of a device according to embodiments herein.

FIG. 6 illustrates a computerized device that can be a printing device 204, that can be used with embodiments herein and can comprise, for example, a printer, copier, multi-function machine, multi-function device (MFD), etc. The printing device 204 includes a controller/processor 224 and a communications port (input/output) 226 operatively connected to the processor 224 and to the computerized network 202 external to the computerized device 204. Also, the computerized device 204 can include at least one accessory functional component, such as a graphic user interface assembly 236 that also operate on the power supplied from the external power source 228 (through the power supply 222).

The input/output device 226 is used for communications to and from the computerized device 204. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 6, a body housing 204 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

The printing device 204 also includes at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Also, the processor 224 can be operatively (meaning directly or indirectly) connected to the first scanner 244 and the second scanner 250. The first scanner 244 can include a lens 256 that causes a distortion of items scanned. The processor 224 performs a calibration process of the first scanner 244 by scanning the first calibration surface 252 using the first scanner 244. During the calibration process, the processor 224 performs a compensation process to remove the distortion from signals output by the first scanner 244 when performing the scanning to identify at least one surface irregularity on the first calibration surface 252. After performing the compensation process, the processor 224 adjusts the calibration process to apply correction for pixels affected by the surface irregularity. After adjusting the calibration settings, the processor 224 finalizes the calibration process and stores the first scanner settings.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:
a media path;
a scanner positioned on a first side of said media path;
a calibration surface position on a second side of said media path across from said scanner, said first side of said media path being opposite said second side of said media path; and
a processor operatively connected to said scanner,
said scanner including a lens causing a distortion of items scanned,
said processor performing a calibration process of said scanner using dedicated calibration hardware, by scanning said calibration surface using said scanner,
during said calibration process, said processor and dedicated hardware performing a compensation process to remove said distortion from signals output by said scanner when performing said scanning to identify at least one surface irregularity on said calibration surface,
after performing said compensation process, said processor adjusting said calibration hardware to apply correction for pixels affected by said surface irregularity,
said correction comprising using settings of adjacent pixels as settings for said pixels affected by said surface irregularity,
said adjacent pixels not being affected by said surface irregularity, and
after adjusting said calibration hardware, said processor and hardware finalizing said calibration process and storing scanner settings.

2. The apparatus according to claim 1, said compensation process increasing prominence of signals identifying said surface irregularity by removing said distortion from said signals output by said scanner.

3. The apparatus according to claim 1, after storing said scanner settings, said scanner scanning sheets of media moving along said media path as said sheets of media pass by said scanner using said scanner settings, said correction only being applied during said calibration process and said correction not being applied during said scanning of said sheets of media.

4. The apparatus according to claim 1, said scanner and said calibration surface being in fixed, non-movable locations with respect to each other and with respect to said media path.

5. The apparatus according to claim 1, said adjacent pixels being directly next to said pixels affected by said surface irregularity.

6. The apparatus according to claim 1, said processor identifying said surface irregularity by matching said signals output by said scanner to known signals caused by surface debris.

7. An apparatus comprising:
a media path;
a first scanner positioned at a first location of said media path;
a first calibration surface position at said first location of said media path across from said scanner;
a second scanner positioned at a second location of said media path different than said first location;
a second calibration surface position at said second location of said media path, said second scanner being movable over said second calibration surface; and
a processor operatively connected to said first scanner and said second scanner,
said first scanner including a lens causing a distortion of items scanned,
said processor performing a calibration process of said first scanner by scanning said first calibration surface using said first scanner,
during said calibration process, said processor performing a compensation process to remove said distortion from signals output by said first scanner when performing said scanning to identify at least one surface irregularity on said first calibration surface,
after performing said compensation process, said processor adjusting said calibration process to apply correction for pixels affected by said surface irregularity,
said correction comprising using settings of adjacent pixels as settings for said pixels affected by said surface irregularity,
said adjacent pixels not being affected by said surface irregularity, and
after adjusting said calibration process, said processor finalizing said calibration process and storing first scanner settings.

8. The apparatus according to claim 7, said compensation process increasing prominence of signals identifying said surface irregularity by removing said distortion from said signals output by said first scanner.

9. The apparatus according to claim 7, after storing said first scanner settings, said scanner scanning sheets of media moving along said media path as said sheets of media pass by said first scanner using said first scanner settings, said correction only being applied during said calibration process and said correction not being applied during said scanning of said sheets of media.

10. The apparatus according to claim 7, said first scanner and said first calibration surface being in fixed, non-movable locations with respect to each other and with respect to said media path.

11. The apparatus according to claim 7, said adjacent pixels being directly next to said pixels affected by said surface irregularity.

12. The apparatus according to claim 7, said processor identifying said surface irregularity by matching said signals output by said first scanner to known signals caused by surface debris.

13. A method comprising:
performing a calibration process of a scanner positioned on a first side of a media path by scanning a calibration surface using said scanner, said calibration surface being position on a second side of said media path across from said scanner, said scanner including a lens causing a distortion of items scanned;
during said calibration process, performing a compensation process using a processor operatively connected to said scanner to remove said distortion from signals output by said scanner when performing said scanning to identify at least one surface irregularity on said calibration surface;
after performing said compensation process, adjusting said calibration process using said processor to apply correction for pixels affected by said surface irregularity, said correction comprising using settings of adjacent pixels as settings for said pixels affected by said surface irregularity, said adjacent pixels not being affected by said surface irregularity; and
after adjusting said calibration process, finalizing said calibration process and storing scanner settings, using said processor.

14. The method according to claim 13, said compensation process increasing prominence of signals identifying said surface irregularity by removing said distortion from said signals output by said scanner.

15. The method according to claim 13, further comprising after storing said scanner settings, scanning sheets of media moving along said media path as said sheets of media pass by said scanner using said scanner settings, said correction only being applied during said calibration process and said correction not being applied during said scanning of said sheets of media.

16. The method according to claim 13, said scanner and said calibration surface being in fixed, non-movable locations with respect to each other and with respect to said media path.

17. The method according to claim 13, said adjacent pixels being directly next to said pixels affected by said surface irregularity.

18. The method according to claim 13, further comprising identifying said surface irregularity by matching said signals output by said scanner to known signals caused by surface debris.

19. A method comprising:
   performing a calibration process of a scanner positioned on a first side of a media path by scanning a calibration surface using said scanner, said calibration surface being position on a second side of said media path across from said scanner, said scanner including a lens causing a distortion of items scanned;
   during said calibration process, performing a compensation process using a processor operatively connected to said scanner to remove said distortion from signals output by said scanner when performing said scanning to identify at least one surface irregularity on said calibration surface, said compensation process comprising calculating a ratio of a white reference profile to a delayed reference profile to produce a unity profile, said white reference profile comprising an undistorted profile of said calibration surface, said delay reference profile comprising said signals output by said scanner delayed by a delay period, said delay period comprising a light delay time caused by a shape of said lens, said unity profile revealing pixel-to-pixel differences up to a size of said delay period to identify said surface irregularity;
   after performing said compensation process, adjusting said calibration process using said processor to apply correction for pixels affected by said surface irregularity, said correction comprising using settings of adjacent pixels as settings for said pixels affected by said surface irregularity, said adjacent pixels not being affected by said surface irregularity; and
   after adjusting said calibration process, finalizing said calibration process and storing scanner settings, using said processor.

20. The method according to claim 19, said compensation process increasing prominence of signals identifying said surface irregularity by removing said distortion from said signals output by said scanner.

21. The method according to claim 19, further comprising after storing said scanner settings, scanning sheets of media moving along said media path as said sheets of media pass by said scanner using said scanner settings, said correction only being applied during said calibration process and said correction not being applied during said scanning of said sheets of media.

22. The method according to claim 19, said scanner and said calibration surface being in fixed, non-movable locations with respect to each other and with respect to said media path.

23. The method according to claim 19, said adjacent pixels being directly next to said pixels affected by said surface irregularity.

24. The method according to claim 19, further comprising identifying said surface irregularity by matching said signals output by said scanner to known signals caused by surface debris.

* * * * *